United States Patent [19]
Larsonneur

[11] Patent Number: 4,602,975
[45] Date of Patent: Jul. 29, 1986

[54] ADHESIVE STRIP APPLICATOR METHOD AND APPARATUS

[75] Inventor: Lionel M. Larsonneur, Pomona, Calif.

[73] Assignee: Paper-Pak Products, Inc., La Verne, Calif.

[21] Appl. No.: 582,947

[22] Filed: Feb. 23, 1984

[51] Int. Cl.[4] .......................................... B32B 31/12
[52] U.S. Cl. ...................................... 156/291; 5/484; 156/238; 156/540; 427/208.2; 428/78
[58] Field of Search .......................... 5/484, 496, 498; 156/238, 291, 540; 427/208.2; 428/78

[56] References Cited

U.S. PATENT DOCUMENTS 2,898,816 8/1959 Keely .............................. 156/357 X
4,097,943 7/1978 O'Connell ................................ 5/484
4,214,933 7/1980 Off et al. ............................. 156/238

*Primary Examiner*—Robert A. Dawson
*Attorney, Agent, or Firm*—Henry M. Bissell

[57] ABSTRACT

Apparatus and method for developing and applying an adhesive strip and protective cover strip on the backing side of a hospital underpad. The apparatus is positioned along the production line where the folded hospital underpad material has been fabricated and is ready for cutting into individual pads. The apparatus draws a continuous ribbon from a supply spool, applies a strip of liquid plastic melt adhesive to the upper side of this ribbon, and then inverts the ribbon and directs it, with the adhesive strip on the underside, onto the intermediate layer of the folded underpad material where rollers press it into the desired position. The plastic melt adhesive fuses to the portion of the hospital underpad backing layer with which it comes in contact. After the folded sheet material is cut into individual hospital underpads, the ribbon serves as a protective strip which may be easily pulled away from the adhesive strip when the hospital underpad is to be placed in service.

24 Claims, 6 Drawing Figures

U.S. Patent   Jul. 29, 1986   Sheet 1 of 2   4,602,975
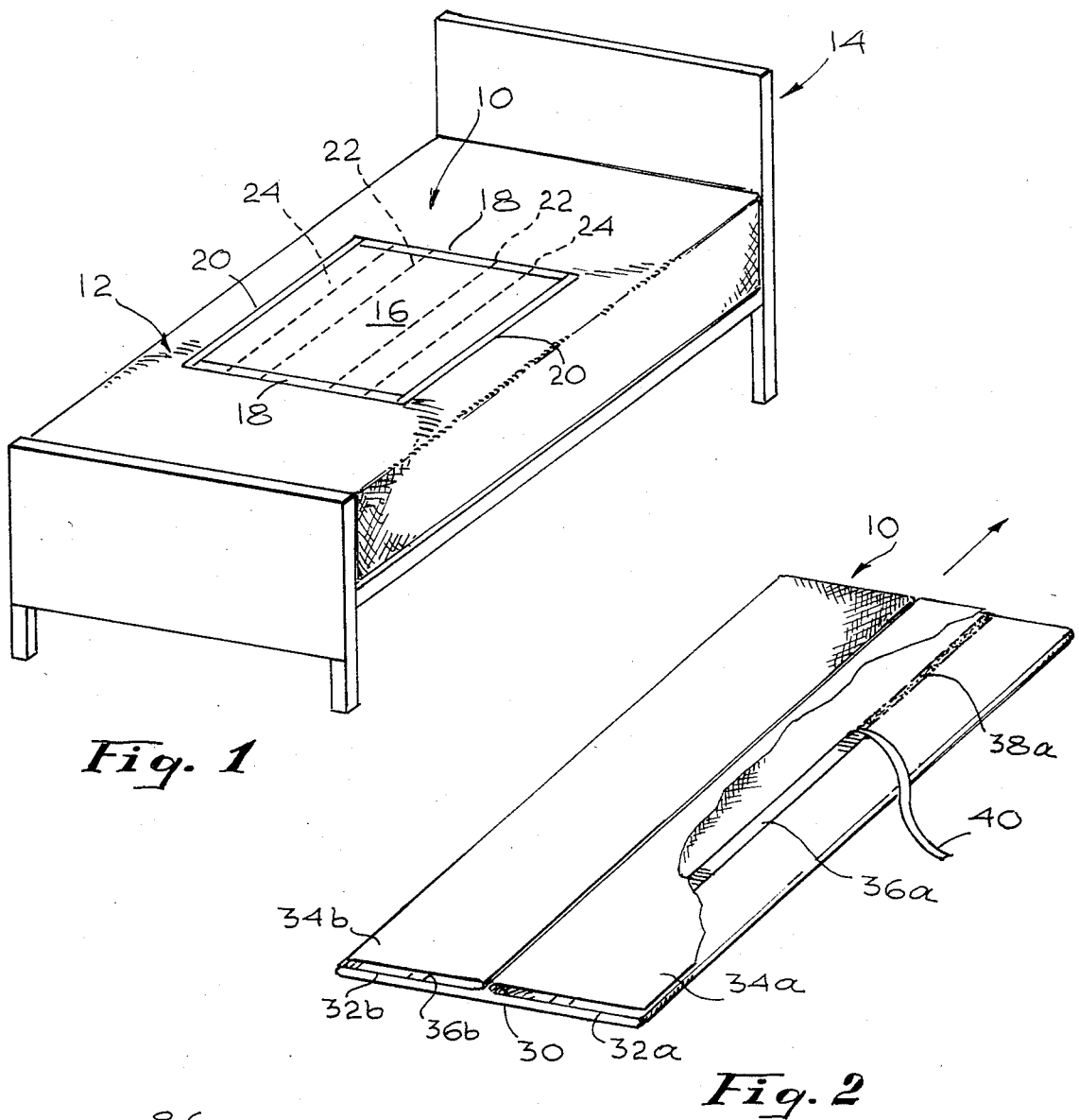
Fig. 1
Fig. 2
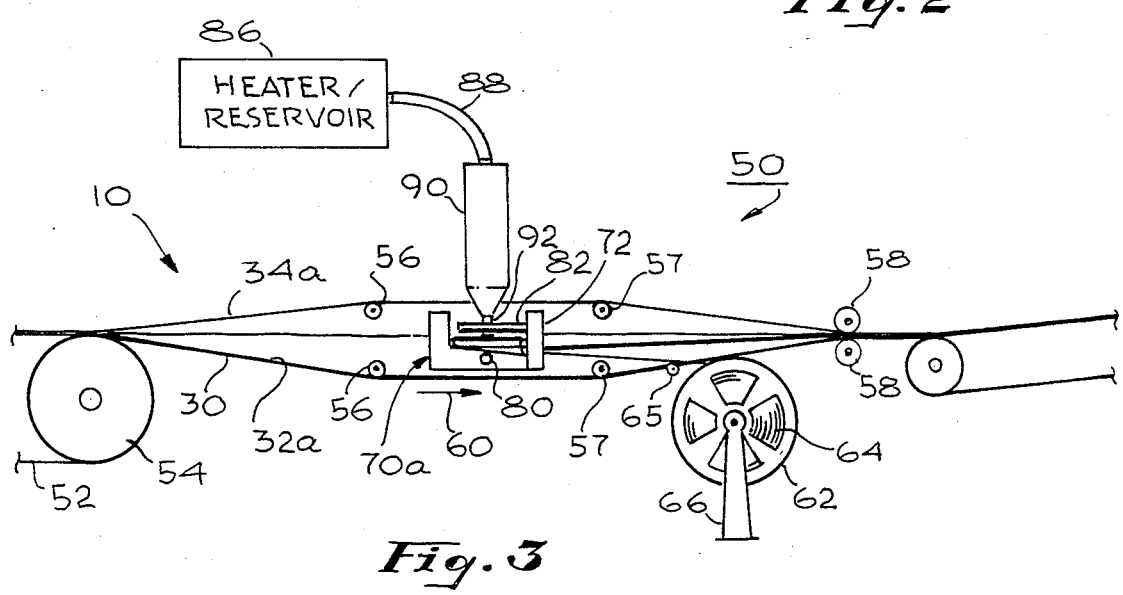
Fig. 3

ADHESIVE STRIP APPLICATOR METHOD AND APPARATUS

BACKGROUND OF THE INVENTION

1. Field of the Invention

This invention relates to the production of hospital underpads and, more particularly, to the application of adhesive strips to the underside of such pads.

2. Description of the Prior Art

Absorbent pads have been developed and are commercially available for use, particularly by hospitals, in protecting bedding against soiling and damage from incontinent patients. Such hospital underpads have been developed as a preferable alternative to the rubber sheet. Since these underpads are more comfortable for a patient to lie on, they are placed on top of the lower sheet, thereby protecting both the lower sheet and the mattress. A typical absorbent underpad comprises a plurality of soft, fibrous tissue layers backed by a soft, waterproof plastic backing layer. The four edges of the backing layer are turned and/or sealed. The absorbent tissue layers are uniform and lump free, and provide maximum absorbency and dispersion of liquid with retention within the pad. Runoff or leakage is prevented by virtue of the sealed edges and the impervious backing layer. These hospital underpads are provided in appropriate sizes to cover the vulnerable area underneath the patient and are available in individual packs for ease of stocking and handling.

Without more, such underpads may exhibit a tendency to bunch up underneath the patient, particularly where the patient may be restless and moves about a great deal in the bed. This tendency may be exacerbated where the underpad has already absorbed some liquid. When the underpad becomes bunched up or displaced from its desired position of maximum effectiveness, the result is discomfort to the patient and lack of intended protection to the bedding.

I have recently developed an improved absorbent underpad which obviates the problem of maintaining the underpad in place on a bed. This improved underpad is provided with a pair of self-adhering adhesive strips which are aligned as a pair of parallel tracks along the exposed surface of the plastic underlayer of the pad. The adhesive strips are covered with readily removable backing strips so that the adhesive is protected until the backing strips are removed in preparation for use.

SUMMARY OF THE INVENTION

The present invention relates to the formation of the adhesive strips and backing strips as integral elements and the application of adhesive strips to the underpad backing layer at a station in the production line where the underpads are fabricated. In brief, arrangements in accordance with the present invention comprise fixtures installed adjacent the production line where the continuous, folded underpad material, as fabricated and prior to cutting into individual underpads, passes on its way to the cutting station.

A fixture serves to part or separate a pair of adjacent folded layers, draw a continuous ribbon of treated paper protective strip from a reel past an applicator where liquid plastic adhesive is applied to an upper side of this ribbon, and then invert the ribbon and apply it on a continuous basis to a folded backing layer portion of the hospital underpad. Two such fixtures are installed at the adhesive applying station, one on each side of the production line, for applying two adhesive strips adjacent opposed edges of the underpad material. The folded underpad material and adhesive-bearing backing strip ribbon are passed between rollers which press the adhesive against the hospital underpad backing layer in the desired location, and then move onward along conveyors to the cutting station where the underpad material is cut into individual underpads for further processing and packaging, packing in cartons, sterilizing, etc.

A fixture according to the present invention comprises a generally U-shaped channel having oppositely angled extensions of the bottom surface of the channel for causing the backing strip ribbon to invert twice as it passes through the fixture. In traversing the fixture, the ribbon enters through a first guide opening in an extension of one side of the channel and passes over the angled bottom surface extension where it becomes inverted and undergoes a 90° change of direction. In passing through the fixture, along the bottom surface of the channel, a stream of melted plastic in liquid form is applied to form the adhesive strip which at this point is borne by the protective backing strip ribbon. This liquid plastic is applied by gravity and physical contact as a continuous stream from an overhead applicator which receives the melted plastic from a thremally-controlled heated reservoir. Next, the backing strip ribbon with the soft melted plastic strip thereon undergoes a second inversion and 90° change of direction by passing over the second angled extension of the channel bottom surface and through a second guide opening in a second sidewall extension of the channel at the opposite end from the first guide. After leaving the fixture through the second guide, the backing strip ribbon with the adhesive now on the underside is fed into the underpad material between folded layers thereof so that the adhesive immediately adheres on contact to the upper side of one of the folds of the backing layer. The aforementioned rollers press the combination together to insure that the adhesive is affixed to the backing layer and also serve to draw the backing strip with ribbon and adhesive along the production line with the underpad material. Upon cooling of the adhesive strip the ribbon, which now constitutes a protective strip for the adhesive, can readily be peeled off in preparation for use of the pad.

BRIEF DESCRIPTION OF THE DRAWING

A better understanding of the present invention may be had from a consideration of the following detailed description, taken in conjunction with the accompanying drawing in which:

FIG. 1 is a perspective view of an absorbent underpad to which the present invention is directed, shown in position for use on a bed;

FIG. 2 is a perspective view, partially broken away, of the underpad of FIG. 1 in a folded configuration, showing the adhesive strip and protective backing applied in the practice of the present invention;

FIG. 3 is a schematic side elevational view of the apparatus of the present invention;

DESCRIPTION OF THE PREFERRED EMBODIMENT

Figure 4:
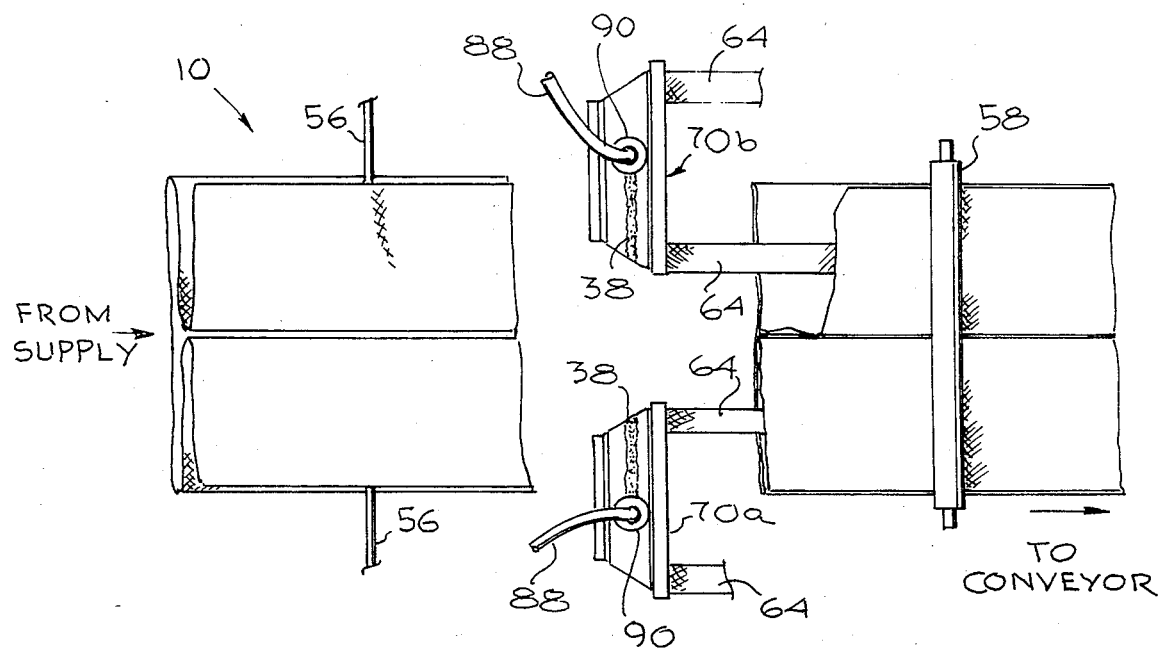
FIG. 4 is a schematic plan view of the apparatus of FIG. 3.

As particularly shown in FIG. 1, a hospital underpad 10 is positioned for use on the lower sheet 12 of a hospital bed 14. The underpad 10 comprises an absorbent central area 16 with sealed lateral edges 18 and longitudinal edges 20 folded over and sealed. As fabricated and packaged, the underpad 10 is folded in thirds along longitudinal fold lines indicated by the broken lines 22, and each outer third is folded again along longitudinal fold lines corresponding to the broken lines 24. FIG. 2 shows the longitudinally folded underpad 10 comprising a central portion 30 with the outer portions double-folded thereover to form intermediate layers 32 and upper layers 34, extending inward from the longitudinal sides of the central portion 30. The upper layer 34a on the right-hand side in FIG. 2 is partially broken away to show a backing strip 36a covering a plastic adhesive strip 38a. The distal end 40 of the backing strip 36a is shown peeled back to expose the adhesive strip 38a. A similar adhesive strip 38b and backing strip 36b are provided in a corresponding position on the other intermediate layer 34b.

The adhesive plastic 38 is formed as a strip on the protective strip 40 in the apparatus 50 of FIG. 3 as one of the final steps in the production line fabrication of hospital underpads 10. The underpad material 10 of FIGS. 3 and 4 is fabricated as a long continuous multilayer sheet generally folded as shown in FIG. 2. It then reaches the station 50 via conveyor 52 and passes over conveyor roller 54. A pair of rods 56, one on each side, serve to separate the upper fold layer 34a from the intermediate layer 32a and bottom layer 30. Pinch rollers 58 serve to draw the material from left to right through the apparatus 50 of FIGS. 3 and 4 in the direction of the arrow 60.

The apparatus 50 of FIGS. 3 and 4 comprises a spool 62 of ribbon 64 supported on the standard 66 on the near side of the underpad material 10 as shown in FIG. 3. Guide rod 65 supports the ribbon 64 as it is being removed from the spool 62. Positioned approximately in the center of the apparatus 50 as shown in FIG. 3 and to either side of the center line of the folded underpad material 10 is a pair of generally U-shaped channel members 70a, 70b. Guides 57 are also provided to spread the layers 34a, 32a of the folded underpad material and keep them from contacting the channel member 70a.

Figure 5:
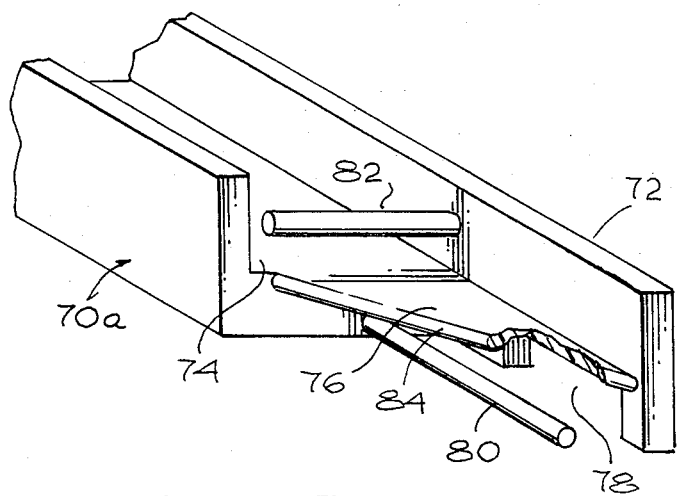
FIG. 5 is a detailed view, partially broken away, of a portion of the apparatus of FIG. 3.
Figure 6:
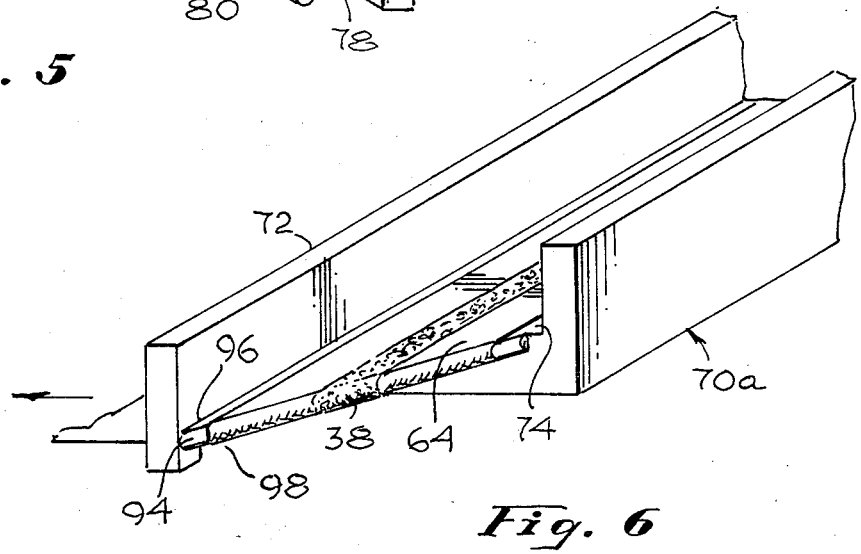
FIG. 6 is a perspective view of another portion of the apparatus of FIG. 3.

As shown in further detail in FIGS. 5 and 6, these channel members are each formed with an extended sidewall 72, as best seen in FIGS. 5 and 6 which are, respectively, perspective views of the outboard and inboard ends of the member 70a. Member 70b is a mirror image of member 70a. The bottom surface 74 of the channel member 70a is also extended at portion 76 and joins the extended end of wall 72 above a guide opening 78. Retainer pegs or rods 80, 82 are mounted respectively in the end of the member 70a and the inner side of wall 72 to help guide the ribbon 64 as it is being fed through the channel member 70a. The extended bottom portion 76 is provided with a rounded edge 84 to facilitate the ribbon 64 sliding thereover.

Referring again to FIGS. 3 and 4, the apparatus 50 further includes a thermally-controlled heater/reservoir 86, one on each side, which is coupled via a hollow tube 88 to an applicator gun 90 which directs the hot melt plastic that is melted in the heater/reservoir 86 onto the ribbon 64 via a nozzle 92.

The inboard end of the channel member 70a (shown in FIG. 6) is similar to the outboard end shown in FIG. 5 except that the juxtaposition of elements is the reverse of the arrangement of FIG. 5. Thus the bottom surface 74 of the channel member 70a is extended by angled portion 96 having a rounded edge 94 which the ribbon 64 slides over. The extended wall 72 includes a guide opening 98 beneath the angled extension 96. In FIG. 6, the ribbon 64 is shown in position with the adhesive strip 38 as deposited on the ribbon by the applicator 90.

In operation, the ribbon 64 is threaded over the ribbon guide 65, through the guide opening 78, above the retaining rod 80, over the rounded edge 84 and along the bottom surface 74 underneath the retaining rod 82 of the channel member 70a. It is then passed underneath the applicator 90 and nozzle 92 to the extended surface 96 where it is fed over the rounded edge 94, through the guide opening 98 and then between the pinch rollers 58 (FIG. 3). This is done with the underpad material 10 in place in the configuration shown in FIGS. 3 and 4. Another ribbon 64 is similarly arranged extending through the channel member 70b in identical fashion. The production line conveyors are then started with the result that the pinch rollers 58 draw the ribbons 64 through the respective channel members 70a, 70b while at the same time drawing the underpad material 10 from conveyor 52 and past the apparatus 50. As the ribbons 64 pass through the respective channel members 70a, 70b, they are inverted twice. The first inversion places the underside facing up so that it may receive the strip of hot melt plastic adhesive 38 deposited thereon by the applicators 90. The second inversion locates the plastic adhesive on the underside of the ribbons 64 so that it may adhere to the layers 32a, 32b of the underpad material 10 as it contacts those layers in the vicinity of the pinch rollers 58. When the underpad material is cut into the underpads 10 of FIG. 2 at a cutting station downstream from the apparatus 50 of FIG. 3, the sections of ribbon 64 become the peel-off protective strips 36a, 36b. Upon contact with the layers 32a, 32b, the hot melt plastic adhesive 38 fuses to the layers 32a, 32b, thus permanently adhering to the backing layer portions 32a, 32b.

The hot melt plastic is a commercially available material and can be obtained from National Starch and Chemical Corporation, 10 Finderne Avenue, Bridgewater, N.J., sold under the product name Lok 34–2823. By applying the adhesive strips in the manner described, the bond between the strips and the plastic underlayer of the pad 10 is developed without the necessity of overheating the underlayer, which would risk melting it.

It is preferable, but not essential, to perform two inversions of the ribbon 64 as it traverses the apparatus 50 and applicator 90 where the adhesive strip is applied. The first inversion at the entry to the channel member 70 could be dispensed with by locating the ribbon spool in line with the channel member 70 for feeding the ribbon longitudinally into the channel member. However, this would take up additional space at the adhesive applying station and is not preferred. Inversion of the ribbon 64 after the adhesive is applied thereto is essential if the strip is to be applied to the intermediate fold layer 32, as has been found to be the preferred location. If, however, the adhesive strip is to be applied instead to the underside of the upper folded layer 34, the ribbon 64 need not be inverted on leaving the channel member 70. In such event, the channel member would be oriented generally aligned with and between the layers 32, 34 of the folded underpad sheet material so that the plastic melt adhesive, applied to the ribbon 64 in the manner described, would be in position to adhere to the upper layer 34, on the underside thereof.

The channel members 70 are preferably formed of Teflon (TM) material to develop minimal frictional resistance to the sliding of the ribbon 64 through the channel. An advantage of locating the adhesive strips on the intermediate layers 32 is that the potential for contact with and transfer to the knife blade during the cutting operation is minimized, thus reducing the cleaning problem.

Hospital underpads fabricated in the manner shown and described herein present a definite improvement over the hospital underpads of the prior art. With the use of the adhesive backing strips as described, these underpads will readily maintain their position when placed on a bed sheet for use and eliminate the problem heretofore encountered where the underpads were subject to shifting and bunching up so that they were no longer effective and were uncomfortable to the patient using the bed. While the plastic adhesive is very sticky so that it is able to hold the underpad in position on a bed sheet, it still readily releases its adherence to the bed sheet when the underpad is pulled upward for removal. The provision of the adhesive backing strips on hospital underpads as applied by the method and apparatus of the present invention adds minimal cost to the product while materially enhancing its utility.

Although there have been described above specific arrangements of an adhesive strip applicator method and apparatus in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. The method of applying an adhesive strip covered by a removable protective ribbon to a plastic sheet comprising the steps of:
   drawing a ribbon from a supply spool along a support surface;
   applying a continuous adhesive layer of liquid plastic melt adhesive on the upper surface of the ribbon as it is drawn along the support surface; and
   pressing the ribbon with the thus-developed adhesive strip in a liquid molten state against the plastic sheet to fuse the strip thereto.

2. The method of claim 1 wherein the sheet material to which the adhesive strip is to be applied is presented in a folded configuration, further comprising the step of spreading apart a pair of adjacent folded layers prior to inserting the ribbon and applied adhesive strip between said layers.

3. The method of claim 2 further including the step of pressing the folded layers together to adhere the adhesive strip to the adjacent layer after the ribbon and adhesive are inserted between the layers.

4. The method of claim 3 further including the steps of applying the adhesive to the ribbon in an orientation which is essentially orthogonal to the alignment of the folded sheet material, and inverting the ribbon and re-orienting it approximately 90° to orient the ribbon generally in alignment with the folded sheet material and with the adhesive on the underside of the ribbon.

5. The method of claim 4 wherein the ribbon as drawn from the supply spool is generally parallel to the orientation of the folded sheet material, further including the step of inverting the ribbon and re-orienting it by approximately 90° prior to drawing the ribbon past the adhesive applicator along the support surface with an orientation generally orthogonal to the alignment of the sheet material.

6. The method of claim 5 wherein the ribbon inverting and re-orienting steps include drawing the ribbon through a first guide in the sidewall of a channel member defining the support surface, inverting and re-orienting the ribbon by drawing it upward and over an angled extension of the support surface at an entry end of the channel member, inverting and re-orienting the ribbon after the adhesive has been applied to the upper surface thereof by drawing it downward over an angled extension of the support surface at the exit end of the channel member, and drawing the ribbon out of the channel member through a second guide in the sidewall below the angled extension of the support surface at the exit end.

7. Apparatus for developing and applying an adhesive strip and a protective backing ribbon on a layer of folded sheet material comprising:
   means for drawing a ribbon from a supply spool along a support surface adjacent the sheet material;
   applicator means for applying a liquid stream of plastic melt adhesive to an upper surface of the ribbon as it traverses the support surface; and
   means for directing the ribbon with the adhesive strip in a liquid molten state extending along one surface thereof to a surface of the sheet material to fuse the adhesive strip to said sheet material surface.

8. The apparatus of claim 7 wherein the support surface is provided by a generally U-shaped channel member having at least one angled extension of the support surface at the exit end of the channel member for causing the ribbon with the adhesive strip thereon to invert and re-orient through approximately $\pi°$ at the exit end of the member.

9. The apparatus of claim 8 wherein the channel member includes two oppositely angled extensions of the support surface for causing the ribbon to invert and re-orient through approximately 90° at both the entry end and the exit end of the channel member.

10. The apparatus of claim 9 wherein the channel member includes an elongated sidewall extending along the support surface and the extensions thereof, said elongated sidewall defining a guide opening below each angled extension for directing the ribbon therethrough.

11. The apparatus of claim 10 wherein the channel member defines a ribbon path through a first one of said guide openings at the entry end, upward and over an edge of the first one of the angled extensions, along the support surface to the second angled extension at the exit end, downward over an edge of the second angled extension, and outwardly through a second guide opening below the angled extension at the exit end.

12. The apparatus of claim 11 wherein each of said edges is rounded to facilitate the passage of the ribbon thereover.

13. The apparatus of claim 11 wherein at least the edges of the angled extensions over which the ribbons pass are made of low-friction synthetic resin polymer.

14. The apparatus of claim 11 wherein the channel member is made of low-friction synthetic resin polymer.

15. The apparatus of claim 11 wherein the adhesive applying means comprises an applicator generally centrally located above the support surface of the channel member for applying a stream of melted liquid plastic adhesive along the ribbon generally in the center thereof, whereby the ribbon leaving the support member through the second guide opening carries with it the deposited stream of liquid adhesive as an adhesive strip on the underside of the ribbon.

16. The apparatus of claim 8 further including means for separating adjacent layers of the folded sheet material to traverse the apparatus respectively above and below the channel member.

17. The apparatus of claim 16 further including a roller for pressing the separated layers together with the adhesive strip and ribbon backing between the layers.

18. The apparatus of claim 8 comprising a pair of channel members and applicator means, one on each side of the sheet material.

19. The apparatus of claim 7 further including a thermally controlled heat reservoir for melting plastic for the adhesive and maintaining it in a liquid condition at a predetermined temperature.

20. The apparatus of claim 19 further including means for transferring melted adhesive from the reservoir to the applicator and causing the applicator to direct a stream of liquid adhesive to the ribbon.

21. The apparatus of claim 11 further including guiding means adjacent the entry end of the channel member for retaining and guiding the ribbon in position on said path.

22. The apparatus of claim 21 wherein the guiding means comprises a first retaining rod extending generally longitudinally from one end of the channel member below the angled extension at the entry end and adjacent the first guide opening.

23. The apparatus of claim 22 wherein the guiding means further comprises a second retaining rod mounted in a sidewall of the channel member above the support surface adjacent the angled extension at the entry end.

24. The method of preparing an adhesive strip and removable protective strip in an integral combination and applying it to a plastic substrate comprising the steps of:

depositing a melted plastic layer at an elevated temperature on the upper surface of a carrier ribbon as said ribbon is drawn past an applicator station; and
inverting the carrier ribbon and directing the ribbon and melted plastic layer to contact the substrate with the layer against the substrate, whereby the layer fuses to the substrate to become the adhesive strip and whereby the carrier ribbon becomes the removable protective strip upon cooling of the plastic layer.

* * * * *